(12) United States Patent
Mallon et al.

(10) Patent No.: US 11,119,741 B2
(45) Date of Patent: Sep. 14, 2021

(54) COMPILING DEVICE AND METHOD

(71) Applicant: KONINKLIJKE PHILIPS N.V., Eindhoven (NL)

(72) Inventors: William Charles Mallon, Eindhoven (NL); Alan Pestrin, Salzburg (AT); Oscar Garcia Morchon, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 16/955,113

(22) PCT Filed: Dec. 19, 2018

(86) PCT No.: PCT/EP2018/085714
§ 371 (c)(1),
(2) Date: Jun. 18, 2020

(87) PCT Pub. No.: WO2019/121831
PCT Pub. Date: Jun. 27, 2019

(65) Prior Publication Data
US 2020/0310767 A1 Oct. 1, 2020

(30) Foreign Application Priority Data
Dec. 20, 2017 (EP) .................................. 17208868

(51) Int. Cl.
*G06F 8/41* (2018.01)
(52) U.S. Cl.
CPC .............. *G06F 8/433* (2013.01); *G06F 8/451* (2013.01)

(58) Field of Classification Search
CPC . G06F 8/41; G06F 40/205; G06F 8/34; G06F 8/433; G06F 21/14; G06F 8/451
See application file for complete search history.

(56) References Cited

U.S. PATENT DOCUMENTS

| | | | |
|---|---|---|---|
| 6,779,114 B1* | 8/2004 | Chow | G06F 21/14 713/189 |
| 10,944,545 B2* | 3/2021 | Wiener | H04L 9/0631 |
| 2003/0221121 A1 | 11/2003 | Chow et al. | |
| 2009/0307500 A1 | 12/2009 | Sato et al. | |
| 2011/0107314 A1* | 5/2011 | Babayan | G06F 8/53 717/132 |
| 2011/0214179 A1 | 9/2011 | Chow et al. | |
| 2014/0013427 A1 | 1/2014 | Liem et al. | |
| 2015/0370560 A1* | 12/2015 | Tan | G06F 9/30058 717/148 |

OTHER PUBLICATIONS

International Search Report and Written Opinion from PCT/EP2018/085714 dated Feb. 13, 2019.

* cited by examiner

*Primary Examiner* — Marina Lee

(57) ABSTRACT

Some embodiments are directed to a compiler device (100) configured to identify a sub-graph (210) in a data flow graph having one or more output nodes marked as encoded and one or more output nodes marked as non-encoded, and to replace the sub-graph by an encoded first sub-graph (210.1), and a non-encoded second sub-graph (210.2), wherein the first sub-graph has only encoded output nodes, and the second sub-graph has only non-encoded output nodes.

20 Claims, 12 Drawing Sheets

COMPILING DEVICE AND METHOD

CROSS-REFERENCE TO PRIOR APPLICATIONS

This application is the U.S. National Phase application under 35 U.S.C. § 371 of International Application No. PCT/EP2018/085714, filed on Dec. 19, 2018, which claims the benefit of EP Patent Application No. EP 17208868.4, filed on Dec. 20, 2017. These applications are hereby incorporated by reference herein.

FIELD OF THE INVENTION

The invention relates to a compiling device, a compiler method, and a computer readable medium.

BACKGROUND OF THE INVENTION

Data used or processed by a program can have a high value. For instance: machine-learning algorithms that allow implementing a given functionality use very specific weights, e.g., of the machine-learning model, learned during a machine learning process. Reverse engineering of the program can reveal those weights so that an attacker can easily replicate or improve the algorithm functionality without requiring access to the data used to train the machine-learning algorithm or computing power to realize the training process. Likewise, some applications compute with secret data, such as secret cryptographic keys. Protecting those keys from authorized use is important.

There are various ways to protect computer programs from reverse engineering that might reveal secret information. For example, various known obfuscation methods make it hard to follow the data flow in a computer program.

Furthermore, encodings may be applied to the data, e.g., variables, on which a computer program acts. An attacker who tries to reverse engineer such a protected program does not know on which data the program acts. For example, various white-box encoding may be used. For example, fully homomorphic encryption can be used to protect the algorithms. However, the automated application of these encoding techniques to a program has risks. A compiler may unwittingly create situations that may be exploited by an attacker. These may help an attacker to defeat the encoding. Even if encoding and decoding operations are inserted manually, there is a risk that security problems are inserted inadvertently.

A known compiler is described in US2003221121A1. The known compiler protects software against tampering and reverse-engineering. The data flow of the program is transformed so that the observable operations are dissociated from the intent of the original software code. The intention is that an attacker will find it hard to understand and decode the data flow by observing the execution of the code.

SUMMARY OF THE INVENTION

The known compiler has the disadvantage that inserting encoding and decoding operations in existing software may create dangerous situations. This problem is addressed in the compiler device and method according to the claims.

For example, a sub-graph may be identified in the data-flow graph which has mixed outputs, e.g., encoded as well as non-encoded outputs. Such non-homogenous sub-graphs can lead to paths in the compiled code in which encoding and decoding operations follow upon each other quickly, leading to a more easily analyzable situation. This problem is particularly acute if the sub-graph is a so-called copy-phi network, e.g., a part which only relates to the flow of a datum in the program.

For example, a sub-graph may be identified in which an encoding operation is followed by a phi operation or copy operation, rather than an operational node. This has the disadvantage that the encoding operation cannot be merged with the following operational node. By back-propagating the operation through the phi or copy operation an opportunity for merging is created.

The improvements made to the data-flow graph may be combined with other known techniques to amend a data-flow graph. For example, optimization techniques known from compiler design may be applied to the data-flow graph. For example, obfuscation techniques to obfuscate the data or data flow may be applied as well.

The compiling device is an electronic device, for example, the compiling device may be a computer, a server, a desktop computer, a laptop, etc. The compiling device may be combined with other programming tools or further compiling devices, e.g., a linker, etc.

The compiler method described herein may be applied in a wide range of practical applications. Such practical applications include the obfuscation of cryptographic applications, e.g., the encryption, decryption, and authentication of digital messages. For example, the compiling method may be applied to the obfuscation of proprietary algorithms, e.g., learning algorithms, image processing, audio processing, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a compiling device, FIGS. 2a-2e schematically show example of an embodiment of a data flow graph, FIGS. 3a-3b schematically show example of an embodiment of a data flow graph, FIG. 4 schematically shows an example of an embodiment of a data encryption and decryption system, FIG. 5 schematically shows an example of an embodiment of encoded software.

LIST OF REFERENCE NUMERALS IN FIGS. 1-4

Figure 1:
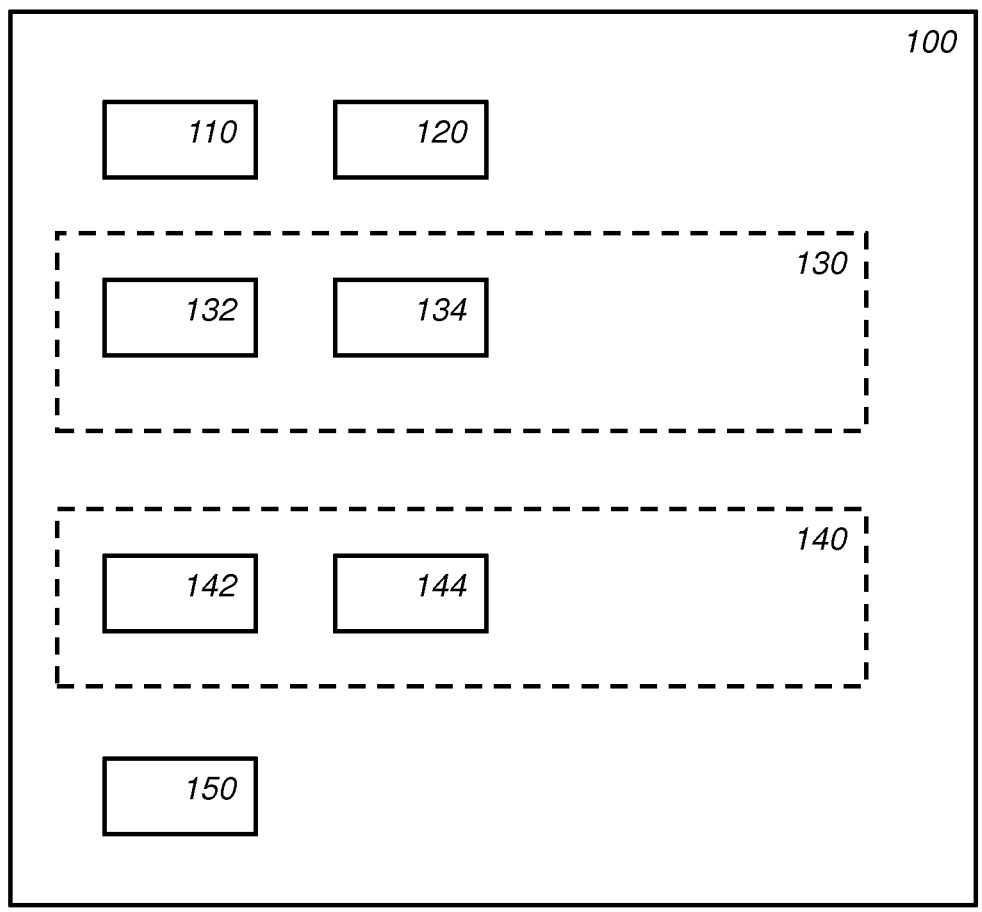

100 a compiler device
110 an input interface
120 a storage
130 a parsing part
132 a dataflow parser
134 an encoding analyzer
140 a modification part
142 a dataflow analyzer
144 a dataflow amendment unit
150 a compiling unit
200-204 a dataflow graph
210 a copy-phi sub-graph
210.1 a copy-phi sub-graph
210.2 a copy-phi sub-graph
212-216 a copy or phi node
212.1-216.1 a copy or phi node
212.2-216.2 a copy or phi node
220 input nodes
221 conversion nodes
222-226 an input node
223 a conversion node
230 output nodes
231 conversion nodes
232-236 an output node
300 a dataflow graph
301 a dataflow graph
310 a copy-phi sub-graph
312 a phi node
314 a copy node
320 input nodes
321 conversion nodes
322,324 an input node
323 nodes
325 a merged node
330 output nodes
332 an output node
332.1, 332.3 a node
410 a node
420 a data generator (e.g., sensor)
422 Encode and encrypt (public key: pubK)
430 Software
432 Algorithm (evalk)
440 Hardware
450 Cloud
460 Software (secure environment)
462 Decrypt & Decode
470 Hardware
472 Secure element (private key: pk)
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

As pointed out above, there may be many reasons to protect computer software from unauthorized reverse engineering. For example, the software may represent a cryptographic operation, e.g., an encryption/decryption operation or a signing operation. There is a desire to keep the secret information that is needed for the cryptographic operation secret. The software may also comprise proprietary algorithms, for example, (trained) neural networks, image processing algorithms, etc. There may be a desire to keep the know-how embedded in the software secret. One approach to doing this is to encode, e.g., encrypt the data that is used in the software. The encoded data may be operated upon by suitably adapted software operators. For example, logic or arithmetic operation, etc., may be encoded as tables or as polynomials over a finite field, etc., so that they can act on encoded data. Such operations are known from the field of white-box cryptography. However, these techniques can be applied outside of cryptography as well. An example of encoding data and using tables to operate on the encoded data is given in "White-box Cryptography and an AES Implementation", by S. Chow, et al.

Since there is great potential to apply encoding of data to various types of software, there is a desire to automate the encoding of data. However, it has turned out that this is not so easy. Embodiments of the invention describes a system and method to automatically determine the variables and computations to be encoded.

During the last years, there has been a huge advance in fully homomorphic schemes and encoding schemes. Using homomorphic schemes make operations on encoded data easier. The first fully homomorphic encryption scheme was proposed by Gentry in 2009. Such a FHE scheme respects both basic algebraic operations, namely addition and multiplication. Since then, many other schemes have been proposed. The Simple Encrypted Arithmetic Library (SEAL) is a practical library that aims at providing a well-engineered and documented homomorphic encryption library, with no external dependencies, that is easy to use both by experts and by non-experts with little or no cryptographic background. SEAL itself uses the FV homomorphic encryption scheme that relies on the RLWE problem. In any (fully) homomorphic encryption scheme, three keys are involved:

The public-key that is used to encrypt plaintext into cipher text.

The evaluation-key that is used to perform operations (e.g., multiplication) in the encrypted domain.

The private-key that allows the user to decrypt the output.

Figure 4:
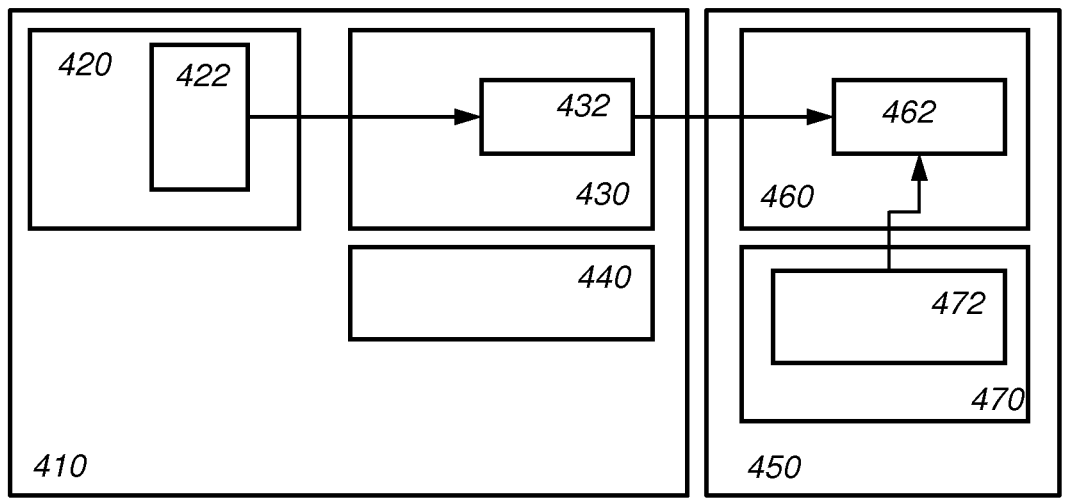

A potential use case is shown in FIG. 4. FIG. 4 shows a node 410, e.g., a computer, and the distribution of encoding/decoding, encryption/decryption functions, and private/public/evaluation keys to different software/hardware blocks. Node 410 comprises a data generator 420, e.g., a sensor. The data generator encrypts the data with a public key pubK. Software 430 performs operation on the software in the encrypted domain, using the evaluation key (evalk). The results of the computations may be sent to software 460 that runs in cloud 450. For example, the software 460 may be trusted to run in a secure environment. Software 460 decrypts the computation results by applying a decryption algorithm 462. For example, the decryption may use a private key, which is stored in some secure element 472. Thus software 430 runs at least in part on encrypted data.

Figure 5:
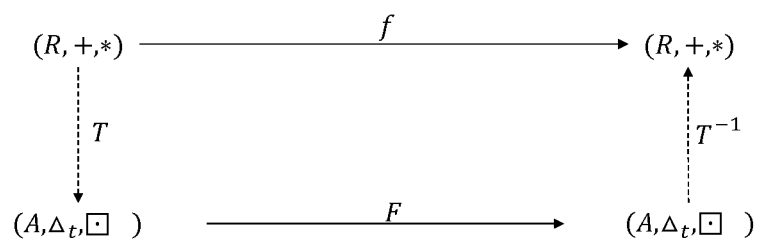

Another application is illustrated in FIG. 5. FIG. 5 schematically shows a representation of operations in the encoded domain. Encoding schemes arising from the field of white-box cryptography have been designed in order to make the reverse engineering of an algorithm and its data more difficult. Encodings can be based, e.g., on (i) nibbles, (ii) residual number systems, or (iii) algebraic transformations, etc. FIG. 5 shows an abstract representation of operations realized in the encoded domain. Instead of an evaluation function f( ) over the ring of integers (R,+,*), the elements in R are transformed by means of transformation T( ) into a different domain A such that the same function f( ) can be implemented based on elements represented in A and alternative operations $\Delta_r$, $\square$. This implementation is denoted as F( ) Such a scheme is to some extent similar to (F)HE schemes in the sense that T( ) can represent the usage of a public-key to encrypt data, operations realized in F( ) involve encoded operations and some type of evaluation key, and the inverse transformation is equivalent to the usage of the private key. In white-box cryptography is usual however to merge the usage of the transformations T( ) and $T^{-1}$( ) into the code itself. The difficulty of extraction relies on, e.g., the difficulty of reverse-engineering the large tables etc. that implement them.

FIG. 1 schematically shows an example of an embodiment of a compiling device 100.

Compiling device 100 comprises an input interface 110 arranged to receive a computer program representation. For example, the computer program representation may be written in a high-level computer program, e.g., in C, Pascal, C#, etc. For example, the computer program representation may be source code. The computer program representation may also be the output of another compiling device which may be arranged for preprocessing computer program code, e.g., by executing macro's, or by parsing computer code. For example, the computer program code representation may be a representation of a dataflow graph of a high-level computer code. The computer program representation may be according to a compiler intermediate language.

Input interface 110 may be a communication interface. Compiling device 100 may communicate with other computer devices over a computer network (not shown in FIG. 1). The computer network may be an internet, an intranet, a LAN, a WLAN, etc. The computer network may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The compiling device may comprise a connection interface which is arranged to communicate with other devices as needed, e.g., to receive the computer program representation. For example, the connection interface may comprise a connector, e.g., a wired connector, e.g., an Ethernet connector, or a wireless connector, e.g., an antenna, e.g., a Wi-Fi, 4G or 5G antenna. The computer program representation may be received in electronic form.

The execution of the compiling device is implemented in a processor circuit, examples of which are shown herein. FIG. 1 shows functional units that may be functional units of the processor circuit. For example, FIG. 1 may be used as a blueprint of a possible functional organization of the processor circuit. The processor circuit is not shown separate from the units in FIG. 1. For example, the functional units shown in FIG. 1 may be wholly or partially be implemented in computer instructions that are stored at device 100, e.g., in an electronic memory of device 100, and are executable by a microprocessor of device 100. In hybrid embodiments, functional units are implemented partially in hardware, e.g., as coprocessors, and partially in software stored and executed on device 100.

Compiling device 100 comprises a storage 120 for storing the computer program representation, e.g., as received from input interface 110. Storage 120 may also be used for storing intermediate representations, e.g., data flow graphs and the like.

Compiling device 100 comprises a parsing part 130, a modification part 140 and a compiling unit 150. The parsing part 130 comprises a dataflow parser 132 and an encoding analyzer 134. Parsing part 130 and encoding analyzer 134 together obtain a data flow graph representation from the computer program representation, wherein at least part of the nodes in the data flow graph are marked as encoded or as non-encoded.

For example, the data flow graph may be in Static Single Assignment (SSA) form. This is a well-known, popular and efficient flow-exposed form used by software compilers as a code representation for performing analyses and optimizations. Effective algorithms based on Static Single Assignment have been developed to address constant propagation, redundant computation detection, dead code elimination, induction variable elimination, and other requirements.

Efficient algorithms for obtaining a data-flow graph, in particular in SSA form, and to optimize and/or compile a computer program based on a data-flow graph are known. A preferred embodiment of the invention is described with respect to static single assignment. A standard reference which may provide background for standard compiler design is "Advanced Compiler Design & Implementation" 1997 by Steven Muchnick (ISBN 1-55860-320-4).

Thus, after partial compilation, we obtain a data-flow graph representation with the static single assignment (SSA) property: each variable is assigned exactly once, and every variable is defined before it is used. In this graph, the edges are (temporal) variables and the nodes are operations (+,−,*, ... ), memory accesses (*p= ... ), etc. An example of a dataflow-graph in SSA form is shown FIG. 2a. In practice, a data-flow graph may be much larger, in which case, FIG. 2a may be regarded as a detail of a larger data-flow graph. The data-flow graph need not be a data-flow graph of an entire program, but may be data-flow graph a part, e.g., a library, a routine, a basic block, etc.

Figure 2A:
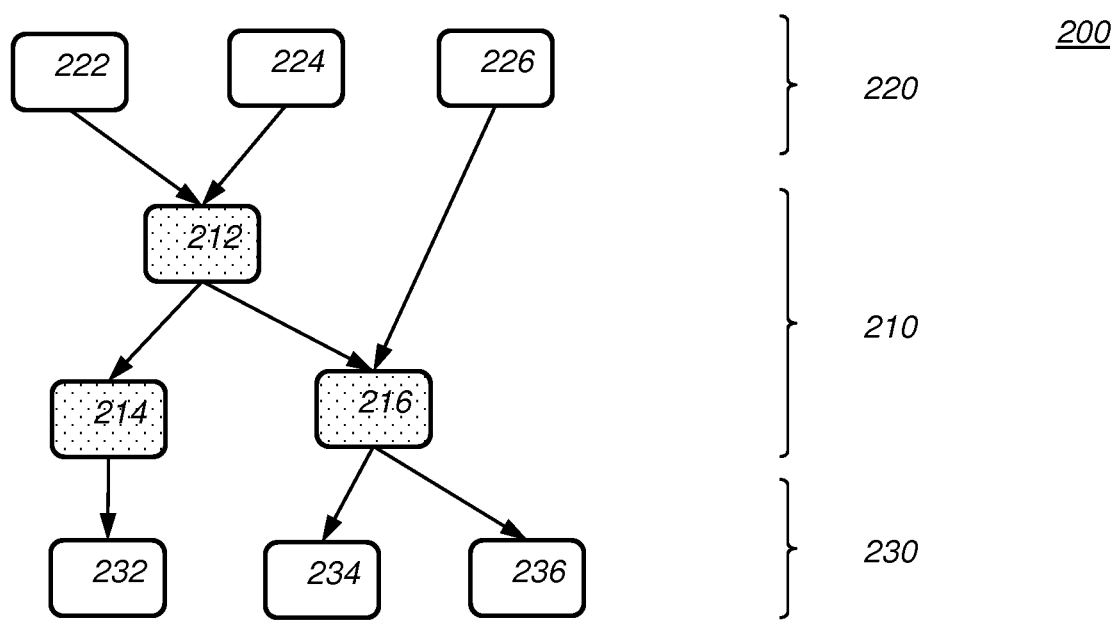

An SSA graph, in particular SSA graph 200, is a type of data-flow graph that represents an intermediate form of computer program code, e.g., of source code. An SSA graph is directed and acyclic. The vertices of an SSA graph (also referred to as nodes) represent operations. The edges of an SSA graph represent data holders, such as registers, e.g., including virtual registers, or memory, e.g., selected parts of the memory. FIG. 2a shows an exemplifying SSA graph corresponding to a computer program (fragment). Note that the SSA graphs which are illustrated graphically herein, may be represented as data structures in an electronic memory of compiling device 100.

Figure 2B:
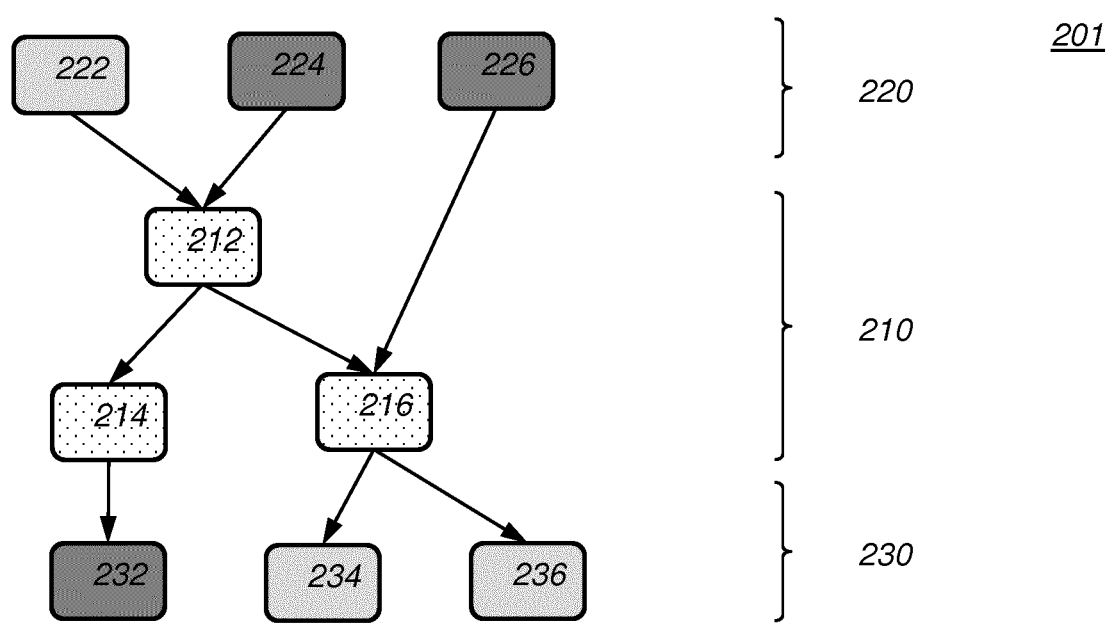

Two types of nodes in the SSA graph are special: copy nodes and phi-nodes. The SSA graph may contain copy nodes that distribute an incoming value to one or more nodes. FIG. 2b shows one such copy node: copy node 214. A phi operation is used to implement data selection caused by control flow in the graph. For instance, z=phi(a,b) means that when the last assignment to a is more recent than the last assignment to b, then a should be assigned to z. Vice versa for b. Example graph 200 comprises two phi-nodes: phi-node 212 and phi-node 216

After parsing and the SSA transform (if needed), the resulting data flow graph may contain sub-graphs, or sub-networks, that consist solely of phi nodes and copy nodes. The borders of such a sub-graph are represented by nodes with different types of statements, e.g., arithmetical operations, memory operations, etc. The latter may be referred to as operational nodes.

A datum that is live during execution and which has multiple sources and multiple targets will be visible in an SSA data-flow graph as a copy-phi network. If the data-flow is in SSA format we may thus identify a datum with multiple sources and multiple targets as a copy-phi network. However, this is not necessary. For example, different types of data-flow graphs have different ways of identifying a datum with multiple sources and multiple targets. As the preferred embodiment described herein uses SSA type data-flow graphs, we will continue to refer to copy-phi networks, or copy-phi sub-graphs.

Data-flow graph 200 shows a copy-phi network 210 having 3 nodes. The other nodes in FIG. 2a may represent other operations. For example, nodes 222 and 234 may represent an increment operation, e.g., 'i: =j+1'. For example, node 224 may represent a read from memory operation. For example, node 226 may represent a parameter input, e.g., an input from a parameter to a routine. For example, node 236 may represent an arithmetic operation. The nodes in the copy-phi network are marked with a speckle pattern in FIGS. 2a-3b.

The encoding analyzer 134 marks nodes in the data flow graph as encoded or as non-encoded. For example, this may be done in a compilation pass, e.g., together with parsing for the data-flow graph. Flow control operations, such as the copy or phi nodes need not be marked. The marking of the nodes as encoded or not-encoded may later be used by compilation unit 150. For example, compilation unit 150 may use native operation to act on non-encoded nodes. For example, an increment operation can be implemented by compiling unit 150, e.g., by a machine 'INC' instruction. For encoded operation, compiling unit 150 may use encoded operations, for example, a library may be called to perform the operation. For example, compiling unit may call an 'ENC_INC( )' operation to perform an encoded increment.

An encoded function receives encoded data and outputs encoded data. For example, encoded operations may be implemented as a table, or as a polynomial over a finite field.

In order to protect a program, its variables and/or the processed data, it is desirable to have a process that automatically creates a program P that is executed in the encrypted domain. For example, a programmer may write programs in the plain domain and only later, the programmer will be interested in executing the programs in the encrypted domain. By automatically, or manually, or part-manual/part-automatic marking of nodes, the compiler unit 150 has the information needed to call the correct encoded or non-encoded functions. Yet, development of the program could take place without much attention to these matters.

Marking nodes as encoded or not-encoded may be done according to encoding rules. For example, a rule base may require some nodes to be non-encoded. For example, nodes corresponding to memory accesses, external function calls, and parameters may be marked non-encoded. For example, in an embodiment, some nodes may be marked non-encoded according to the rules, and all nodes that are left may be marked encoded.

For example, in an embodiment restrictions on encoding may be come from interfaces, e.g., the computer code must interface with devices, memories, or other software that is not compatible with the encoding used. Restrictions on encoding may also come from restrictions in the compiling unit or library used. For example, some operations may not be supported in encoded form, e.g., operations on floating point numbers, etc.

For example, in an embodiment, a two-step approach may be used. Some nodes have to be non-encoded according to the rules, e.g., the ones corresponding to memory accesses, external function calls, etc. All others nodes may initially be marked as green. According to further rules, e.g., heuristics, some nodes may be marked non-encoded even if they were initially encoded. For example, after parsing it may turn out that some operations cannot be performed in encrypted form, e.g., the library does not support them. For example, some nodes may correspond to operations on floating point numbers, but encoded floating point operations may not be available. The compiling unit may output a warning or an output log or the like, so that a programmer can verify which operations are performed in encoded form and which are not. In an embodiment, a programmer may insert compiler directives in the computer program representation. For example, in source code the programmer may indicate which variables are to be encoded, or which variables are not to be encoded. In an embodiment, all nodes, except copy-phi nodes, are marked encoded or non-encoded.

Marking nodes as encoded or non-encoded is illustrated in FIG. 2b. Shown in FIG. 2b is the copy-phi network 210. Also shown are nodes that provide input to copy-phi network 210: input nodes 220; and nodes that receive input from the copy-phi network 210, or that copy-phi network 210 outputs to: output nodes 230. Nodes that are non-encoded are marked dark grey: in this example, nodes 224, 226 and 232. Nodes that are encoded are marked light grey: in this example, nodes 222, 234 and 236.

Compiling device 140 comprises a modification part 140. Modification part 140 is arranged to modify, e.g., amend, the data-flow graph to avoid certain security problems. Preferably, the data-flow graph does not change functionally, however the way operations are performed after the modifications reduces certain security risks. In an embodiment, modification part 140 may comprise a dataflow analyzer 142 and a dataflow amendment unit 144. Dataflow analyzer 142 is arranged to identity potential problems in the sub-graph. Dataflow amendment unit 144 is arranged to modify the data-flow graph to mitigate the problem found by the dataflow analyzer 142.

After deciding which nodes are encoded, and which nodes are not, conversions may be inserted in the data flow graph. Inserting the conversions has the advantage that the data flow graph remains valid: in a dataflow graph with encoded and/or non-encoded operations, the program may not work properly without conversions.

Figure 2C:
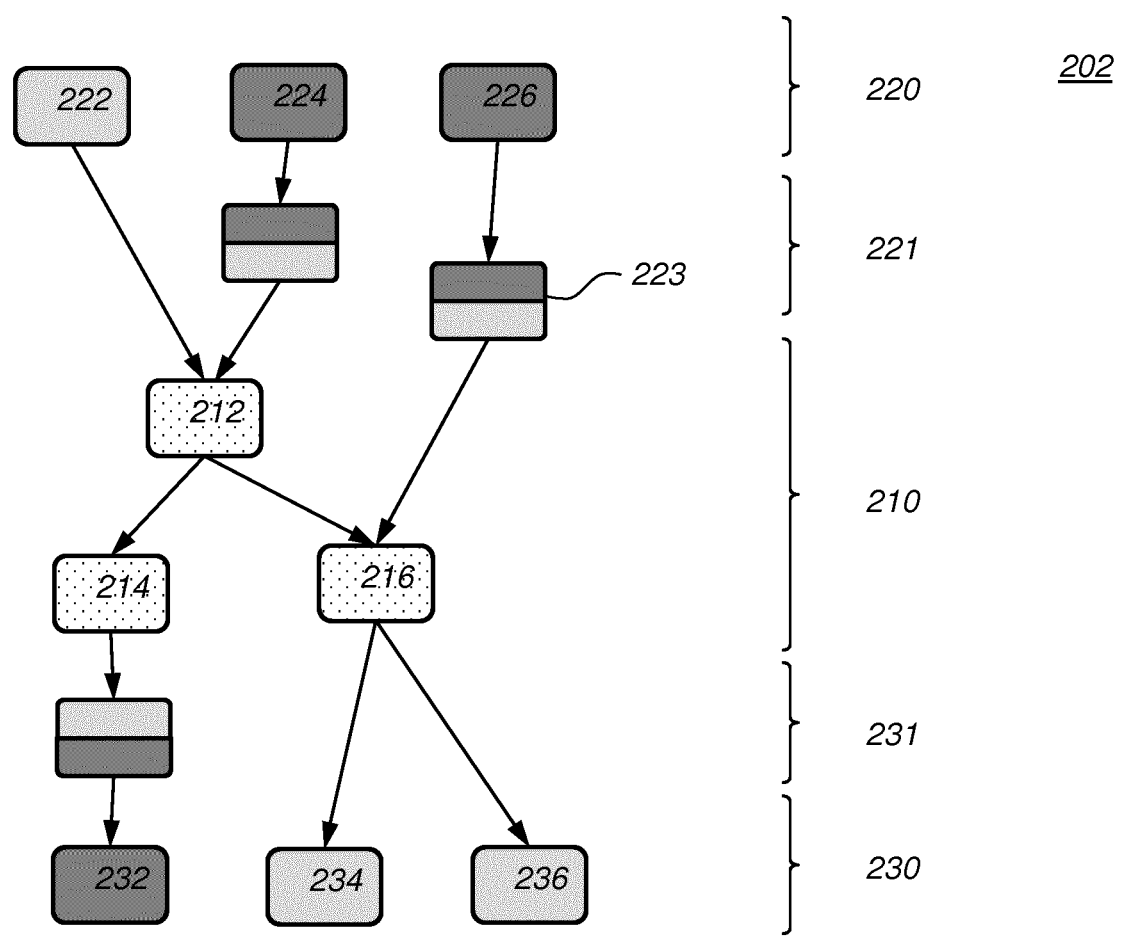

FIG. 2c shows the data-flow graph 201 of FIG. 2b, in which nodes are marked as encoded or as non-encoded. FIG. 2c shows the problems that may arise if a compiler unit were to naïvely implement the encoding/non-encoding markings of FIG. 2b.

The naïve implementation of the copy-phi networks may lead to an encoded realization of the program in which variables are encoded and decoded with only a few copy/phi steps in-between, sometimes after only a single step. In FIG. 2c, conversion nodes 221 and 231 are inserted to convert data from the encoded domain to the non-encoded domain or vice versa. One such inserted conversion is marked with reference numeral 223 in FIG. 2c. For example, phi-node 212 needs both data as encoded or as non-encoded. Accordingly, a conversion node is inserted between phi-node 212 and node 224 to encrypt the output of node 224. On the other hand, node 232 needs its input as non-encoded to a conversion is inserted between phi-node 214 and 232 to convert from encoded to non-encoded. Between phi-node 216 and input node 226 also a conversion needs to be inserted since otherwise phi-node 216 would receive both encoded and non-encoded data. No conversion is inserted after phi-node 216 since all users of the output of phi-node 216 expect encoded data. Conversions may be inserted where needed. For example, in general encoded/non-encoded nodes that receive input or produce output for a non-encoded/encoded node may require a conversion to be inserted. For example, phi functions or copy functions that receive data from multiple non-homogenous input nodes, or produce output for multiple non-homogenous output nodes may require the insertion of conversion nodes.

Note that on the path from node 224 to node 232 data is encoded and shortly thereafter decoded, in conversion nodes 221 and 231. Situations in which a single value is encoded and consecutively decoded are undesirable, since then the encryption/decryption functions, e.g., tables, are visible and easily locatable. Moreover, an encoded value might be propagated through the program without further modification so that it can be "tracked".

In any case, decryption is undesirable and avoiding it is an improvement. For example, if (F)HE is used, then usage of the private key, which is required to decrypt the information, can be a security risk. The private key may not even be available.

If a protected program is created from FIG. 2c, then an attacker can easily learn the encrypted representations of the values since he only needs to find a value that it is going to be encrypted without performing any computations and observe the encrypted output. Given that value, the attacker can derive the encrypted representations of all other values.

For some fully homomorphic encryption schemes and encoding schemes the situation may be worse. For example, if we know an encrypted value E(Y), and the routine which implements the division operation between encrypted values, then by dividing the encrypted/encoded values by themselves, we can obtain the encrypted representation of 1, i.e., E(1)=E(Y)/E(Y). From this value, we can obtain all values even if we do not know the private key or the encodings, e.g., by calling the encrypted addition function.

In an embodiment, dataflow analyzer 142 is arranged to identify a sub-graph in the data flow graph having output nodes marked as encoded and output nodes marked as non-encoded. In other words, a sub-graph that produces both encoded data and non-encoded data. In an embodiment, the sub-graph is restricted to copy-phi networks. For example, dataflow analyzer 142 may be arranged to identify a copy-phi network that produces both encoded data and non-encoded data, e.g., sending data to at least one node marked encoded and to at least one node marked non-encoded, e.g., having outgoing edges towards both encoded and non-encoded nodes. The same may be done in non-SSA type data-flow graphs. For example, a datum may be identified that is live during execution and which has multiple sources and multiple targets, for which the multiple targets include both encoded and non-encoded operations. In an embodiment, the dataflow analyzer 142 is arranged to identify a sub-graph in which both the inputs are mixed, e.g., having encoded and non-encoded inputs, and in which the outputs are mixed, e.g., having both encoded and non-encoded outputs.

Such copy-phi networks may lead to the kind of insecure situations mentioned above. They can be avoided by duplicating and/or splitting the copy-phi network to avoid encoding and immediate decoding of variables and/or data. For example, a copy-phi network in the graph whose inputs and outputs are both encoded and non-encoded may be split and/or duplicated so that the resulting networks have only encoded or non-encoded (plain) outputs, i.e., the outputs are homogeneous.

Dataflow amendment unit 144 may be arranged to replace the identified sub-graph by an encoded first sub-graph, and a non-encoded second sub-graph. The first sub-graph has only encoded output nodes, and the second sub-graph has only non-encoded output nodes. The first sub-graph and the second subgraph may be obtained as further sub-graphs of the sub-graph. Consider for example, FIG. 2e. In FIG. 2e, the copy-phi network 210 has been replaced by a first sub-graph 210.1 and a second sub-graph 210.2. The first sub-graph 210.1 only produces encoded data. The second sub-graph 210.2 only produces non-encoded data. Both sub-graphs can be generated by taking a further subgraph from the un-amended sub-graph. For example, first sub-graph 210.1 corresponds to the subgraph of FIG. 2b formed by nodes 212 and 216. For example, second sub-graph 210.2 corresponds to the subgraph of FIG. 2b formed by nodes 212 and 214. Note that these further subgraphs need not be non-overlapping. For example, node 212 is in both further subgraphs of FIG. 2b.

Since the first sub-graph only produces encoded outputs, it can operate using only encoded inputs. For example, the first sub-graph may be marked as encoded, to indicate to the compiling unit that inputs to the first sub-graph that are not encoded need to be converted. Likewise, the second-subgraph only produces non-encoded outputs, it can operate using only non-encoded inputs. For example, the second sub-graph may be marked as non-encoded, to indicate to the compiling unit that inputs to the second sub-graph that are encoded need to be converted to be non-encoded. FIG. 2e shows this by inserting conversion units at before and after the first and second subgraph. Note that subgraph 210.2 only receives non-encoded inputs while subgraph 210.1 only receives encoded inputs.

For example, the splitting of a network may be realized by first duplicating, e.g., cloning the network and then assigning one of the networks as encoded and the other one as non-encoded. After this step, the duplicated nodes in a network that interface an input/output path with non-encoded variables may be marked as an unsecured path in which the intermediate nodes must not be encoded, and duplicated nodes in a network that interface an input/output path with encoded variables will be marked to be a secure path in which the intermediate nodes must be encoded.

Figure 2D:
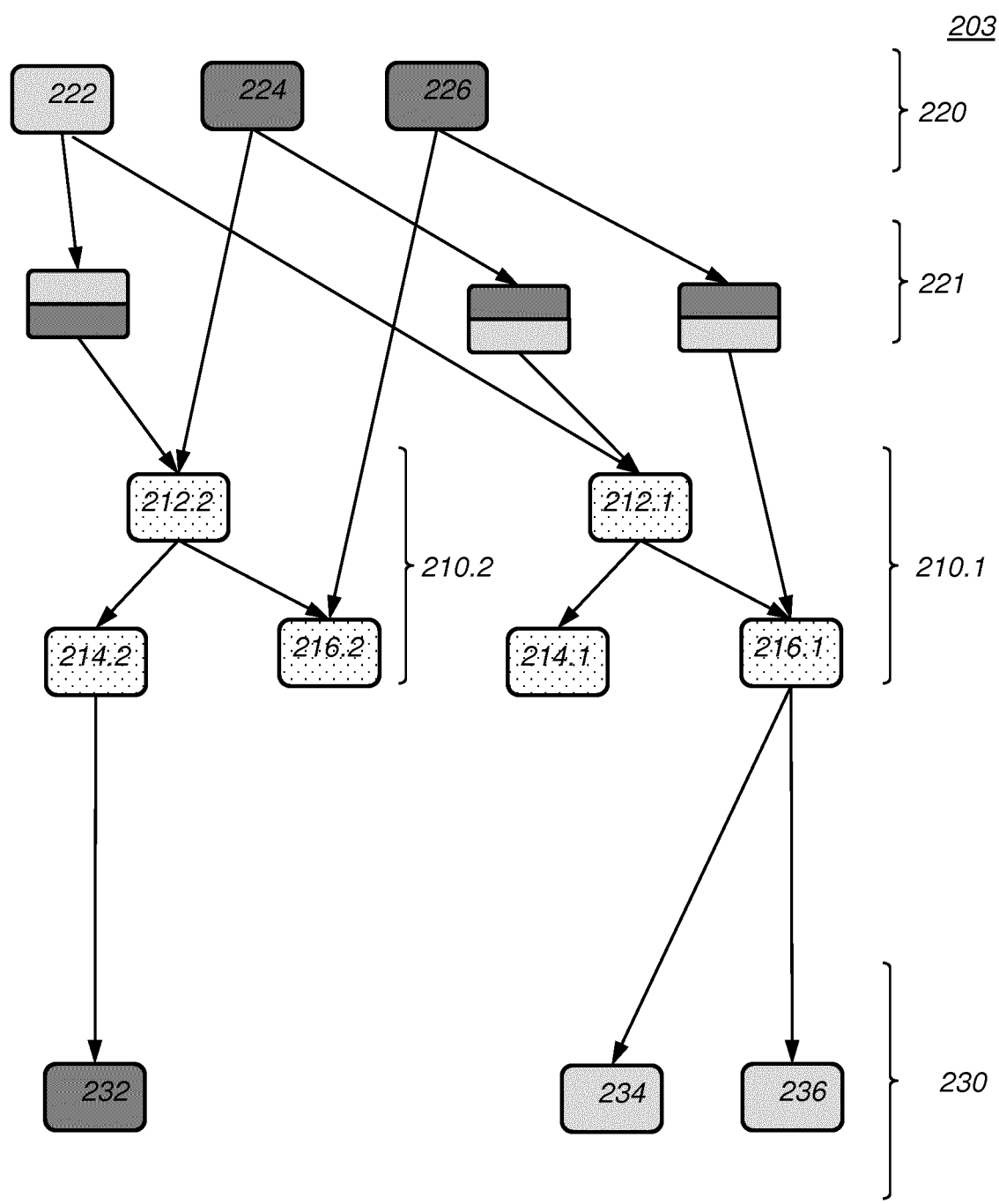
Figure 2E:
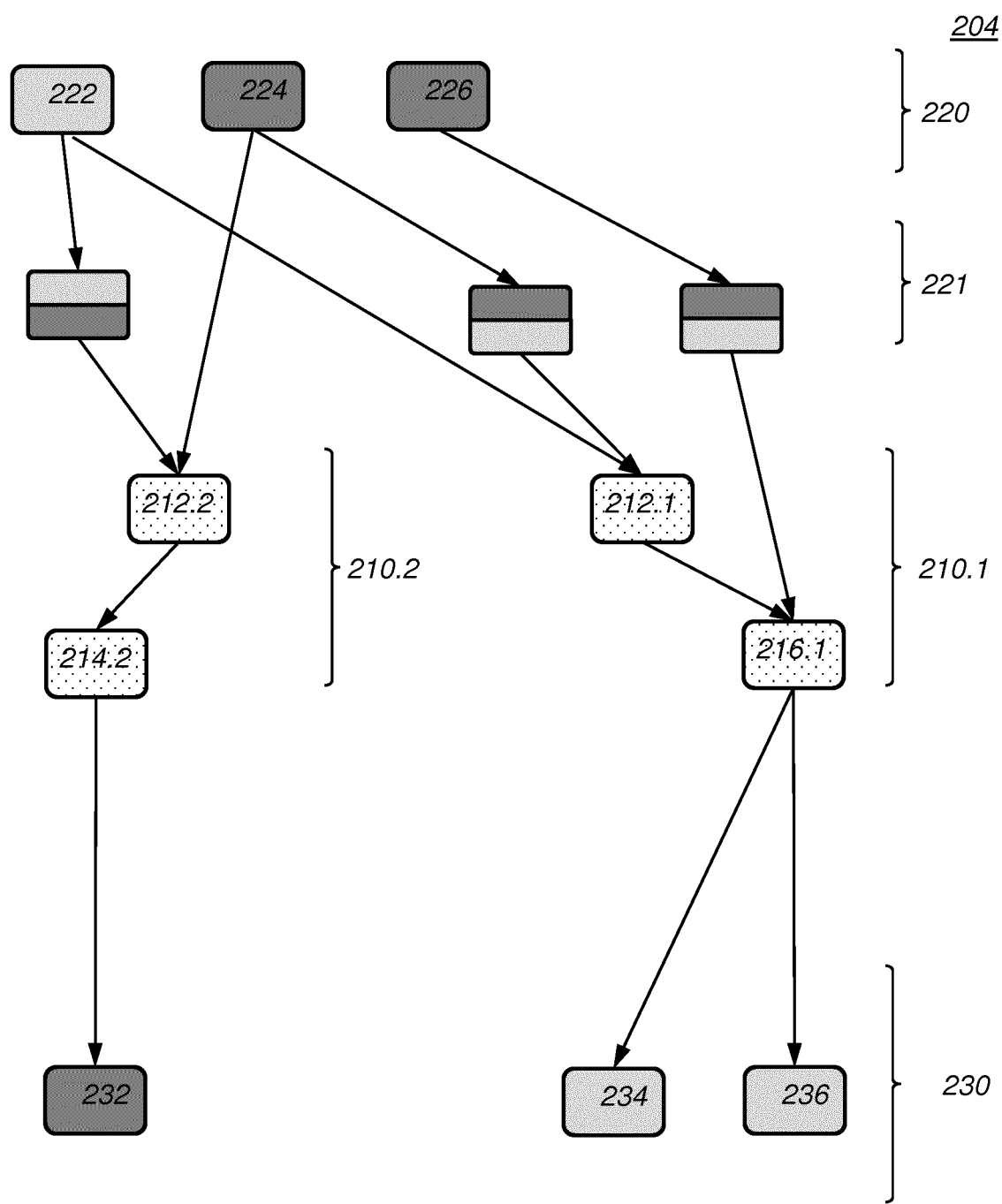

A particular efficient way of producing the graph of FIG. 2e is illustrated in FIG. 2d. In FIG. 2d the entire copy-phi network 210 is duplicated in a first encoded sub-graph 210.1 and a second non-encoded sub-graph 210.2. Note that the nodes in the sub-graphs receives inputs from the same nodes as the original copy-phi network 210 received inputs from. Conversions 221 are inserted between input nodes 220 and first and second copy-phi network 210.1 and 210.2 so that the first copy-phi network 210.1 only receives encoded input, and the second copy-phi network 210.2 only receives non-encoded inputs. That is the input nodes 220 in FIG. 2d send their outputs to twice the number of nodes, because of the duplication. That is, the incoming edges to the copy-phi network, e.g., directly after the input nodes are also duplicated, one copy for each duplicated copy-phi network. At the output side this duplication is not done however, encoded output nodes remain connected only to the encoded copy-phi network 210.1, non-encoded output nodes remain connected only to the non-encoded copy-phi network 210.2. That is, outgoing edges of the copy-phi network are not duplicated.

Interestingly, by running a standard dead-code removal optimization on the amended sub-graph of FIG. 2d, the nodes that are not needed are removed. In particular, nodes 216.2 and 214.1 are dead and will be removed. This produces the graph of FIG. 2e.

Finally, compiling unit 150 can use the amended dataflow graph of FIG. 2e to compile the computer program representation. It is possible to perform further optimizations and the like on the data-flow graph, as is usual in the art of compiling. Furthermore, finding and resolving security problems may be iterated on the data-flow graph.

Thus, an embodiment may be used to automatically determine the variables and computations that are to be encoded, e.g., homomorphically encrypted in a program. This may be done by looking for dangerous situations, such as the ones described herein, in an intermediate representation of a program, e.g., with the SSA property.

In an embodiment, a dataflow analyzer 142 is arranged to find different potential problems and dataflow amendment unit 144 is arranged to resolve these. For example, in an embodiment, dataflow analyzer 142 is arranged to identify a flow node, an encoding or decoding operating before the flow node, and an operating node after the flow node. The flow node may be a phi node or a copy node. We will assume below that the flow node is a phi node. The analysis is similar for a copy node.

This identification may be done both before or after performing the analysis illustrated with FIGS. 2a-2e.

Figure 3A:
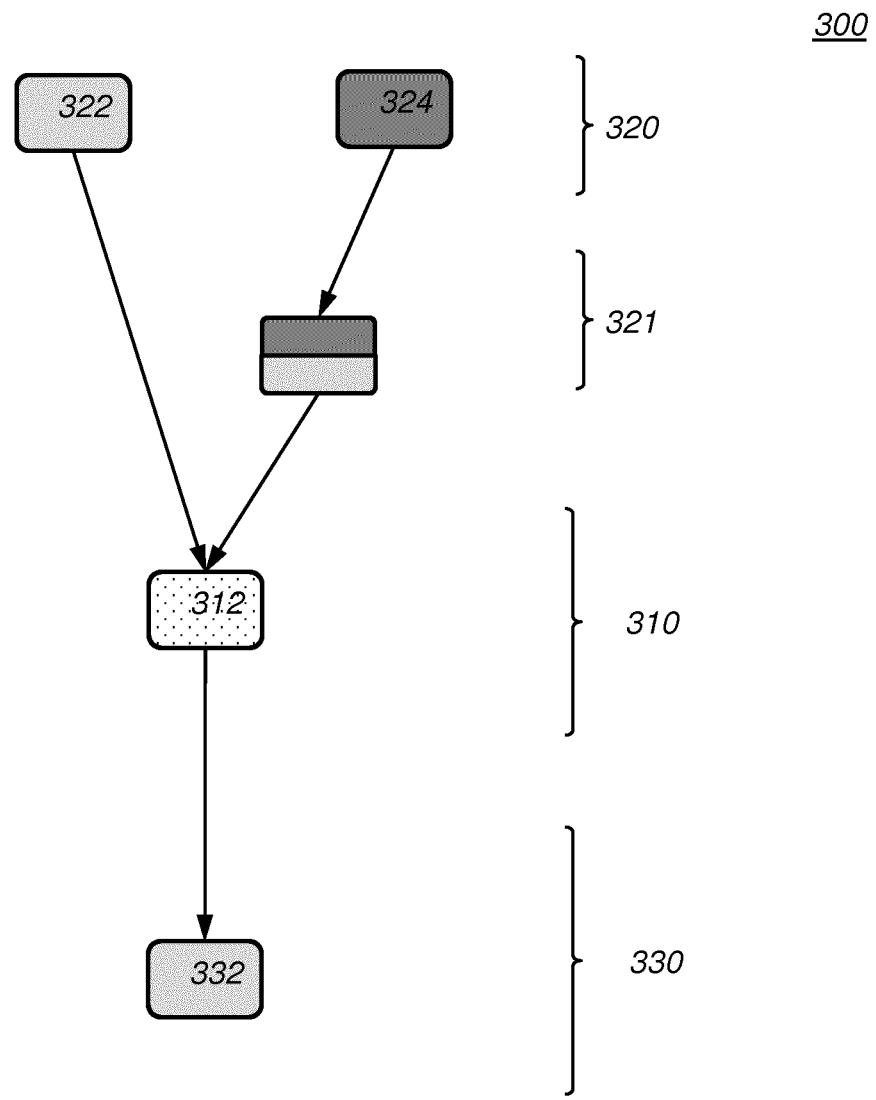

FIG. 3a illustrates an example of this situation. FIG. 3a shows an SSA data-flow graph comprising a phi-node 312, and three operation nodes 322, 324 and 332. For example, the latter may represent a non-flow operation, e.g., non-phi or non-copy nodes. Again, some of the operations may be marked non-encoded, e.g., node 324, some may be marked encoded, e.g., node 322 and 332. A conversion 321 is inserted between non-encoded input node 324 and phi-node 312. This situation is not desired. Such a standalone encryption function may be applied to any input parameter; Encoded values can be traced, etc.

This situation may be addressed by backwards propagation of nodes up in the SSA program flow graph, e.g., moving up operations past the phi-node. The goal when doing this is to hide the encoding function by merging it with an encoded operation.

Figure 3B:
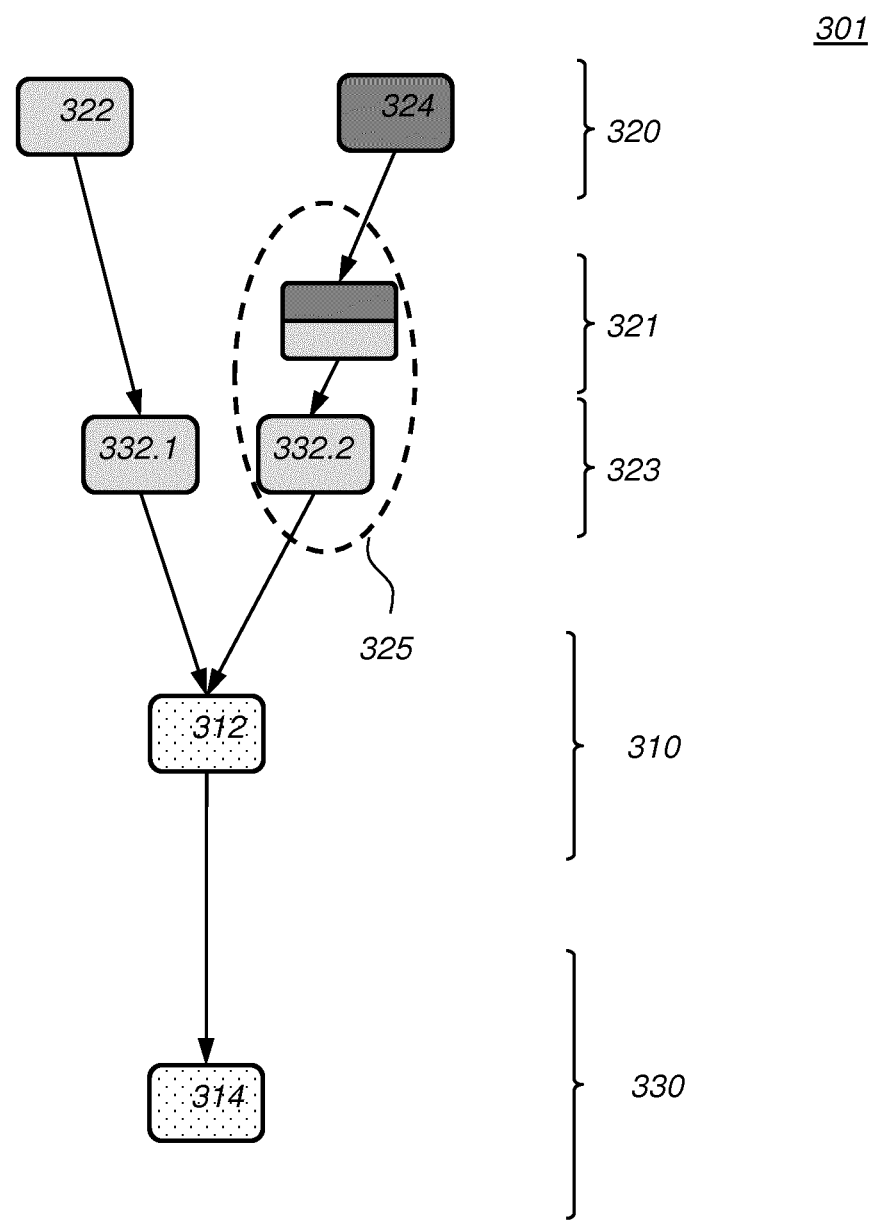

This is illustrated in 3a in which an operation 332 that is located after the phi operation in FIG. 3a is moved to before the phi operation in FIG. 3b so that the encoding of the input parameter can be merged with the +1 statement by the creation of a corresponding lookup table. At the location where operational node 332 is removed, a copy node 314 may be inserted.

For example, dataflow amendment unit 144 may be configured remove the operating node identified by dataflow analyzer 142 from after phi operation 312 and inserting one or more operating nodes before the phi operation. In this case, the operating node is duplicated as many times as the phi-node has inputs. This is shown in FIG. 3b as duplicated operations 332.1 and 332.2. The result of the moving up is that at least one of the duplicated operations 332, in this case operation 332.2, and the conversion 321 become adjacent in the data flow graph. As a result, the conversion 321 may be replaced by a single merged operation. In practice this may be done by combining the table or polynomial, etc., that implements the conversion with the operation 332.2. For example, operation 332.2 may implement an encoded function F( ) If the conversion is encryption Enc( ), the new merged operation may be F(Enc( )). Similarly, if the function F( ) is an encoding of plain function f( ), then the merged operation may be Enc(f( )).

In FIG. 3b the two operations are indicated by an oval 325. Oval 325 may thus be replaced with a combined encoding and operating node. Of course, merging may be applied as well, in case a conversion operation is adjacent to an operational node without back-propagation being needed. For example, in case a data flow graph comprises the subgraph, comprising the conversion node 321 and operation 332.2, then merging may be directly applied.

For example, in FIG. 2e, merging may be applied by back-propagating node 232 through copy node 214.2 and through phi node 212.2. Note that, although the operation can be back-propagated, here it is not necessary, since the conversion can be merged with the preceding instruction (the encrypted operation preceding the conversion). Note that, this would have been impossible if that preceding instruction was not encoded, which is the scenario in which we need the distribution is most advantageous.

When a neighboring operation is an encoded operation, we can usually merge. The problems arise when none of the neighboring operations is encoded. (For instance, when the ancestor is a non-encoded operation, and the descendant is a phi-copy operation).

Backpropagation may also be used if a phi-node, such as node 312 has multiple operating output nodes. This may be resolved by first duplicating the phi-node, and its input edges. Each of the operating output nodes then receives output of a single one of the duplicates of the phi-node. After the duplicating step, backpropagation may be used as needed. The same holds if the flow node is a copy node with multiple outputs. Also in this case the multiple outputs may be reduced by duplicating the copy nodes.

Note that in an encoding based approach, merging the tables that implement the computational operations, which have been moved backwards in the program flow graph, and the encoding tables, makes the reverse engineering of the program much harder since an attacker first needs to guess the implemented functionality and from there use it to reverse engineer the encodings.

Thus, given a SSA data flow graph, it may be improved by scanning for the data-flow graph for dangerous situations. For example, a dangerous situation is defined as a network that has both encoded and non-encoded outputs. Next, a check is made if any of the available techniques can be applied to mitigate the identified dangerous situations. For example, code may be duplicated, split, and operations may be back-propagated. If so, the solution is applied. If no technique is available, the network is marked as unprotected and problematic, which has the advantage that a programmer can pay special attention to this part of the code. Finally, encoding, e.g., encryption may be assigned to each network that requires encryption, each network comprising a number of variables protected under the same encryption. Finally, a protected program is obtained with reduced exposure of encoding/decoding functions.

In an embodiment, the compiler device is configured specifically to identify a sub-graph by identifying in the amended or un-amended data flow graph: a phi node (312), an encoding or decoding operating before the phi node (321), and an operating node (332) after the phi node; and to mitigate this problem by removing the operating node from after phi operation and inserting one or more operating nodes before the phi operation, and merging an inserted operating node with the encoding or decoding operation. For example, this may be done independent from making sub-graphs more homogenous as shown in FIGS. 2a-2e. However, in an embodiment both functions are performed. For example, a compiling device may identify a problem and select an appropriate solution as needed. For example, a compiling device may first identify non-homogenous copy-phi networks, and after resolving these, apply backpropagation as needed.

In the various embodiments of compiling device 100, the input interface 110 may be selected from various alternatives. For example, the interface may be a network interface to a local or wide area network, e.g., the Internet, a storage interface to an internal or external data storage, a keyboard, an application interface (API), etc. For example, a computer program representation may be received from an internal or external computer program representation storage. For example, a computer program representation may be received from a keyboard, etc.

The compiling device may have a user interface, which may include well-known elements such as one or more buttons, a keyboard, display, touch screen, etc. The user interface may be arranged for accommodating user interaction for inputting a computer program representation, performing a compilation, etc.

Storage 120 may be implemented as an electronic memory, say a flash memory, or magnetic memory, say hard disk or the like. Storage 120 may comprise multiple discrete memories together making up Storage 120. Storage 120 may also be a temporary memory, say a RAM.

Typically, the compiling device 100 comprises a microprocessor (not separately shown in FIG. 1) which executes appropriate software stored at the device 100; for example, that software may have been downloaded and/or stored in a corresponding memory, e.g., a volatile memory such as RAM or a non-volatile memory such as Flash (not separately shown). Alternatively, the compiling device 100 may, in whole or in part, be implemented in programmable logic, e.g., as field-programmable gate array (FPGA). Device 100 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, the compiling device comprises a communication interface circuit, a storage circuit, a dataflow parser circuit, an encoding analyzer circuit, a dataflow analyzer circuit, a dataflow amendment unit circuit, a compiling unit circuit. The compiling device may comprise additional circuits. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 6A:
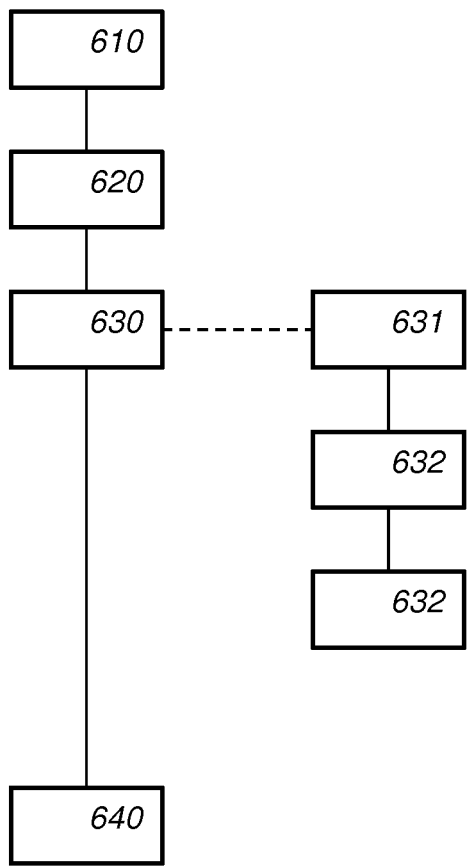
FIGS. 6a, 6b and 6c schematically show examples of embodiments of a compiling method, FIG. 7a schematically shows a computer readable medium having a writable part comprising a computer program according to an embodiment, FIG. 7b schematically shows a representation of a processor system according to an embodiment.

FIG. 6a schematically shows an example of an embodiment of a compiler method 600. Method 600 comprises
receiving (610) a computer program representation,
obtaining (620) a data flow graph (201) representation from the computer program representation, at least part of the nodes in the data flow graph being marked as encoded or as non-encoded,
amending (630) the data flow graph by
identifying (631) a sub-graph (210) in the data flow graph having one or more output nodes marked as encoded and one or more output nodes marked as non-encoded,
replacing (632) the sub-graph by an encoded first sub-graph (210.1), and a non-encoded second sub-graph (210.2), wherein the first sub-graph has only encoded output nodes, and the second sub-graph has only non-encoded output nodes, the first sub-graph and the second subgraph being obtained as further sub-graphs of the sub-graph, and
inserting (633) one or more nodes (221) representing an encoding operation before the first sub-graph, so that the first sub-graph operates only on encoded data, and/or inserting one or more nodes representing a decoding operation before the second sub-graph, so that the second sub-graph operates only on non-encoded data, and
obtaining (640) a compilation of the computer program representation from at least said amended data flow graph.

Figure 6B:
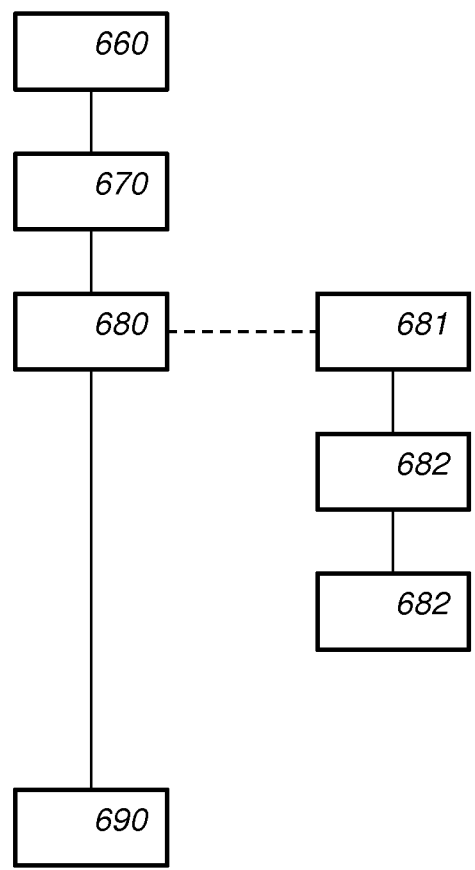

FIG. 6b schematically shows an example of an embodiment of a compiler method 650. Method 650 comprises
receiving (660) a computer program representation,
obtaining (670) a data flow graph (201) representation from the computer program representation, at least part of the nodes in the data flow graph being marked as encoded or as non-encoded,
amending (680) the data flow graph by
identify (681) in the amended or un-amended data flow graph: a phi node (312), an encoding or decoding operating before the phi node (321), and an operating node (332) after the phi node,
removing (682) the operating node from after phi operation and inserting one or more operating nodes before the phi operation, and
merging (683) an inserted operating node with the encoding or decoding operation, and
obtain (690) a compilation of the computer program representation from at least said amended data flow graph.

Figure 6C:
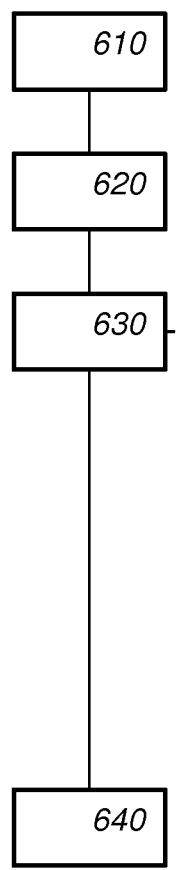
Figure 6C:
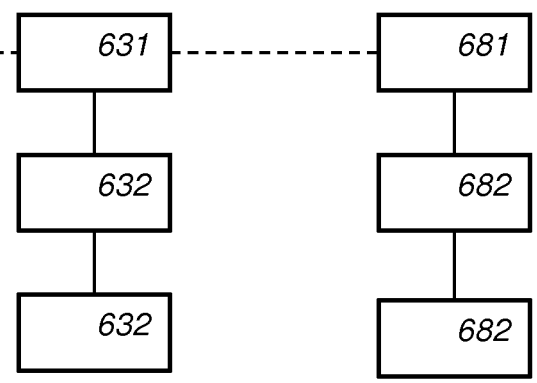

Both methods may be comprised, e.g., as in the following embodiment of the compiling method. FIG. 6c schematically shows an example of an embodiment of a compiler method 601. Compiler method 601 comprises receiving (610, 660) a computer program representation, obtaining (620, 670) a data flow graph (201) representation from the computer program representation, at least part of the nodes in the data flow graph being marked as encoded or as non-encoded, amending (630, 680) the data flow graph by identifying (631) a sub-graph (210) in the data flow graph having one or more output nodes marked as encoded and one or more output nodes marked as non-encoded, or identify (681) in the amended or un-amended data flow graph: a phi node (312), an encoding or decoding operating before the phi node (321), and an operating node (332) after the phi node, in the first case replacing (632) the sub-graph by an encoded first sub-graph (210.1), and a non-encoded second sub-graph (210.2), wherein the first sub-graph has only encoded output nodes, and the second sub-graph has only non-encoded output nodes, the first sub-graph and the second subgraph being obtained as further sub-graphs of the sub-graph, and inserting (633) one or more nodes (221) representing an encoding operation before the first sub-graph, so that the first sub-graph operates only on encoded data, and/or inserting one or more nodes representing a decoding operation before the second sub-graph, so that the second sub-graph operates only on non-encoded data, and in the second case removing (681) the operating node from after phi operation and inserting one or more operating nodes before the phi operation, and merging (682) an inserted operating node with the encoding or decoding operation, and obtaining (640,690) a compilation of the computer program representation from at least said amended data flow graph.

The amending step 630 may be repeated multiple times, e.g., until no further subgraphs are identified.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform method 600, 601, or 650. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

The following numbered clauses include embodiments that are contemplated and nonlimiting:

1. A compiler device (100) comprising an input interface (110) arranged to receive a computer program representation, a processor circuit configured to obtain a data flow graph (201) representation from the computer program representation, at least part of the nodes in the data flow graph being marked as encoded or as non-encoded, amend the data flow graph by identifying a sub-graph (210) in the data flow graph having one or more output nodes marked as encoded and one or more output nodes marked as non-encoded, replacing the sub-graph by an encoded first sub-graph (210.1), and a non-encoded second sub-graph (210.2), wherein the first sub-graph has only encoded output nodes, and the second sub-graph has only non-encoded output nodes, the first sub-graph and the second subgraph being obtained as further sub-graphs of the sub-graph, and inserting one or more nodes (221) representing an encoding operation before the first sub-graph, so that the first sub-graph operates only on encoded data, and/or inserting one or more nodes representing a decoding operation before the second sub-graph, so that the second sub-graph operates only on non-encoded data, and obtain a compilation of the computer program representation from at least said amended data flow graph.

2. A compiler device comprising an input interface (110) arranged to receive a computer program representation, a processor circuit configured to obtain a data flow graph (201) representation from the computer program representation, at least part of the nodes in the data flow graph being marked as encoded or as non-encoded, identify in the amended or un-amended data flow graph: a flow node (312), an encoding or decoding operating before the flow node (321), and an operating node (332) after the flow node, wherein the flow node (312) is a copy node or a phi node, amend the data flow graph by removing the operating node from after flow node and inserting one or more operating nodes before the flow node, and merging an inserted operating node with the encoding or decoding operation, and obtain a compilation of the computer program representation from at least said amended data flow graph.

3. A compiler method (600) comprising receiving (610) a computer program representation, obtaining (620) a data flow graph (201) representation from the computer program representation, at least part of the nodes in the data flow graph being marked as encoded or as non-encoded, amending (630) the data flow graph by identifying (631) a sub-graph (210) in the data flow graph having one or more output nodes marked as encoded and one or more output nodes marked as non-encoded, replacing (632) the sub-graph by an encoded first sub-graph (210.1), and a non-encoded second sub-graph (210.2), wherein the first sub-graph has only encoded output nodes, and the second sub-graph has only non-encoded output nodes, the first sub-graph and the second subgraph being obtained as further sub-graphs of the sub-graph, and inserting (633) one or more nodes (221) representing an encoding operation before the first sub-graph, so that the first sub-graph operates only on encoded data, and/or inserting one or more nodes representing a decoding operation before the second sub-graph, so that the second sub-graph operates only on non-encoded data, and obtaining (640) a compilation of the computer program representation from at least said amended data flow graph.

4. A compiler method (650) comprising receiving (660) a computer program representation, obtaining (670) a data flow graph (201) representation from the computer program representation, at least part of the nodes in the data flow graph being marked as encoded or as non-encoded, amending (680) the data flow graph by identify in the amended or un-amended data flow graph: a flow node (312), an encoding or decoding operating before the flow node (321), and an operating node (332) after the flow node, wherein the flow node is a copy node or phi node, removing (681) the operating node from after the flow node and inserting one or more operating nodes before the flow node, and merging (682) an inserted operating node with the encoding or decoding operation, and obtain (690) a compilation of the computer program representation from at least said amended data flow graph.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 7A:
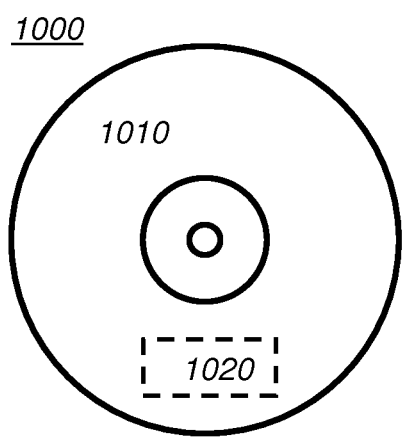

FIG. 7a shows a computer readable medium 1000 having a writable part 1010 comprising a computer program 1020, the computer program 1020 comprising instructions for causing a processor system to perform a compiling method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said compiling method.

Figure 7B:
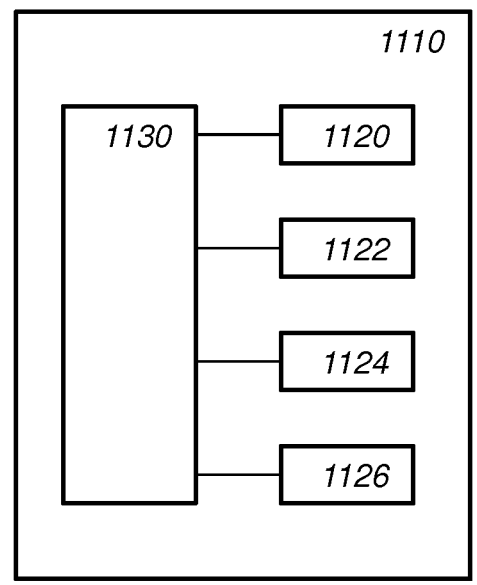

FIG. 7b shows in a schematic representation of a processor system 1140 according to an embodiment of a compiling device. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the compiling device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A compiler device comprising:

an input interface circuit, wherein the input interface circuit is arranged to receive a computer program representation; and a processor circuit, wherein the processor circuit is arranged to obtain a data flow graph representation from the computer program representation, wherein the data flow graph comprises nodes, wherein at least a portion of the nodes in the data flow graph are marked as encoded or as non-encoded, wherein an encoded node represents an operation on encoded data, wherein a non-encoded node represents an operation on non-encoded data, wherein the processor circuit is arranged to amend the data flow graph by identifying a sub-graph in the data flow graph, wherein the sub-graph has at least one output nodes marked as encoded and at least one output nodes marked as non-encoded, wherein the processor circuit is arranged to replace the sub graph by an encoded first sub-graph and a non-encoded second sub-graph, wherein the encoded first sub-graph has only encoded output nodes, and the non-encoded second sub-graph has only non-encoded output nodes, wherein the encoded first sub-graph and the non-encoded second sub-graph are selected from the sub-graph as further sub-graphs, wherein the processor circuit is arranged to insert at least one insert nodes into the data flow graph, wherein the insert nodes represent an encoding operation before the encoded first sub-graph such that the encoded first sub-graph operates only on encoded data, and/or the insert nodes represent a decoding operation before the non-encoded second sub-graph such that the non-encoded second sub-graph operates only on non-encoded data, wherein the processor circuit is arranged to obtain a compilation of the computer program representation from at least the amended data flow graph.

2. The compiler device as in claim 1, wherein at least an input node of the sub-graph is duplicated in the encoded first sub-graph and the non-encoded second sub-graph.

3. The compiler device as in claim 1, wherein the encoded first sub-graph and the non-encoded second sub-graph are a duplication of the sub-graph.

4. The compiler device as in claim 3, wherein the compiler device performs a dead-code removal optimization on the amended sub-graph.

5. The compiler device as in claim 1,
wherein the encoded first sub-graph comprises first nodes,
wherein the first nodes are marked encoded,
wherein the non-encoded second sub-graph comprises second nodes,
wherein the second nodes are marked non-encoded.

6. The compiler device as in claim 1, wherein the data flow graph is a static single assignment graph.

7. The compiler device as in claim 1 wherein the sub-graph consists of phi and copy nodes.

8. The compiler device as in claim 1 wherein the encoding is a homomorphic encryption.

9. The compiler device as in claim 1,
wherein the computer program representation identifies at least one nodes in the data flow graph as marked encoded or as non-encoded.

10. The compiler device as in claim 1,
wherein the sub-graph indicates a datum,
wherein the datum has multiple sources and multiple targets.

11. The compiler device as in claim 1, wherein the sub-graph in the data flow graph has at least one inputs nodes marked as encoded and at least one input nodes marked as non-encoded.

12. The compiler device as in claim 1,
wherein the processor circuit is arranged to identify a flow node in the amended or un-amended data flow graph,
wherein the processor circuit is arranged to identify an operating node before the flow node,
wherein the processor circuit is arranged to identify an operating node after the flow node,
wherein the flow node is a phi node or a copy node,
wherein the processor circuit is arranged to remove the operating node from after the flow node,
wherein the processor circuit is arranged to insert at least one operating nodes before the flow node,
wherein the processor circuit is arranged to merge an inserted operating node with an encoding or decoding operation.

13. A compiler device comprising:
an input interface circuit, wherein the input interface circuit is arranged to receive a computer program representation; and
a processor circuit,
wherein the processor circuit is arranged to obtain a data flow graph representation from the computer program representation,
wherein the data flow graph comprises nodes,
wherein at least a portion of the nodes in the data flow graph is marked as encoded or as non-encoded,
wherein the processor circuit is arranged to identify a flow node in the amended or un-amended data flow graph,
wherein the processor circuit is arranged to identify an operating node before the flow node,
wherein the processor circuit is arranged to identify an operating node after the flow node,
wherein the flow node is selected from the group consisting of a copy node or a phi node,
wherein the copy node distributes an incoming value to at least one further nodes,
wherein the processor circuit is arranged to amend the data flow graph by:
removing the operating node from after the flow node and inserting at least one operating nodes before the flow node; and
merging the operation represented by an inserted operating node with the encoding or decoding operation, and
wherein the processor circuit is arranged to obtain a compilation of the computer program representation from at least the amended data flow graph.

14. A compiler method comprising:
receiving a computer program representation;
obtaining a data flow graph representation from the computer program representation,
wherein the data flow graph comprises nodes,
wherein at least part of the nodes in the data flow graph are marked as encoded or as non-encoded;
amending the data flow graph by identifying a sub-graph in the data flow graph,
wherein the data flow graph has at least one output nodes marked as encoded and at least one or more output nodes marked as non-encoded,
wherein an encoded node represents an operation on encoded data,
wherein a non-encoded node represents an operation on non-encoded data;
replacing the sub-graph by an encoded first sub-graph, and a non-encoded second sub graph,
wherein the encoded first sub-graph has only encoded output nodes,
wherein the non-encoded second sub-graph has only non-encoded output nodes, wherein the encoded first sub-graph and the non-encoded second subgraph are selected from the sub-graphs as further sub-graphs;

inserting at least one insert nodes wherein the at least one insert nodes represent an encoding operation before the encoded first sub-graph such that the encoded first sub-graph operates only on encoded data, and/or inserting at least one nodes representing a decoding operation before the non-encoded second sub-graph such that the non-encoded second sub-graph operates only on non-encoded data; and obtaining a compilation of the computer program representation from at least the amended data flow graph.

15. A compiler method comprising:

receiving a computer program representation;

obtaining a data flow graph representation from the computer program representation, wherein at least a portion of the nodes in the data flow graph are marked as encoded or as non-encoded;

amending the data flow graph by identifying in the amended or un-amended data flow graph a flow node, an operating node before the flow node, and an operating node after the flow node, wherein the flow node is a copy node or phi node, wherein the copy node distributes an incoming value to at least one further nodes;

removing the operating node from after the flow node;

inserting at least one operating nodes before the flow node;

merging the operation represented by an inserted operating node with the encoding or decoding operation; and obtaining a compilation of the computer program representation from at least the amended data flow graph.

16. A computer program stored on a non-transitory medium, wherein the computer program when executed on a processor performs the method as claimed in claim 14.

17. A computer program stored on a non-transitory medium, wherein the computer program when executed on a processor performs the method as claimed in claim 15.

18. The compiler device as in claim 1, wherein the processor circuit is arranged to apply encoding rules to mark some nodes as non-encoded and marking the remaining nodes as encoded.

19. The method as in claim 14, wherein at least an input node of the sub-graph is duplicated in the encoded first sub-graph and the non-encoded second sub-graph.

20. The method as in claim 15, wherein at least an input node of the sub-graph is duplicated in the encoded first sub-graph and the non-encoded second sub-graph.

* * * * *